April 19, 1949.　　　　J. NADER　　　　2,467,563
DYNAMOTOR

Filed May 16, 1946　　　　　　　　　　　2 Sheets-Sheet 1

Inventor
JOSEPH NADER

April 19, 1949.                J. NADER                     2,467,563
                               DYNAMOTOR
Filed May 16, 1946                                    2 Sheets-Sheet 2

Inventor
JOSEPH NADER

Patented Apr. 19, 1949

2,467,563

UNITED STATES PATENT OFFICE 2,467,563

DYNAMOTOR

Joseph Nader, Glen Ellyn, Ill., assignor to Nader Engineering Company, Chicago, Ill., a corporation of Illinois Application May 16, 1946, Serial No. 670,061

10 Claims. (Cl. 171—123)

This invention relates to a dynamoelectric machine, and more particularly to an improved converter construction for supplying an output voltage which is substantially independent of variations in the voltage of the primary power supply or of the load current.

There are many applications wherein there is a distinct need for a dynamoelectric machine which will convert power, received from a primary power source having a widely varying voltage, to either an alternating current or a direct current output in which the voltage is maintained substantially constant and independent of both variations in the voltage of the primary power supply and of the nature of the load, or maintained within narrow prescribed limits for variations of primary power supply voltage and load current over wide prescribed limits. Such problem frequently arises in power systems for aircraft, where the prime mover for the primary generator constitutes the internal combustion engine of the aircraft and accordingly, since the speed of such engine varies over a wide range and in an entirely arbitrary manner so far as the electrical system is concerned, the output voltage of such primary generator is subject to extremely wide variations. In addition, the load to be supplied may vary over wide limits. For example, if the load is the radio apparatus of the plane, it will require much more power input when transmitting than when receiving but the load voltage should nevertheless be maintained substantially constant or within narrow prescribed limits.

It is therefore an object of this invention to provide an improved dynamoelectric machine which, when operated as a converter, will yield novel and desirable voltage and load characteristics.

A further object of this invention is to provide an improved dynamoelectric machine particularly adapted for operation as a converter to derive power from a primary source having excessively large variations in output voltage and convert such power to a substantially constant voltage for application to a load.

Another object of this invention is to provide a dynamoelectric converter for supplying power to a variable load from a variable voltage primary source which will maintain the load voltage within narrow prescribed limits for variations of primary source voltage and load power output over wide limits.

A particular object of this invention is to provide an improved dynamoelectric machine which will operate from a source of variable voltage direct current and supply an output voltage to a load which will be constant for any given power output drawn by such load.

Another particular object of this invention is to provide an improved dynamoelectric machine of the so-called two-stack type having axially displaced field structures disposed in cooperative relation to a common armature carrying a plurality of separate windings. One of such armature windings is connected to supply a load and the field structures associated with such one armature winding are interconnected with the primary voltage source in such manner as to maintain a substantially constant effective flux for the one armature winding so that the output voltage of the armature winding is constant for any given load and substantially independent of variations in the voltage of the primary source.

The specific nature of the invention as well as other objects and advantages thereof will become apparent to those skilled in the art from the following detailed description and the annexed sheets of drawing which, by way of preferred example only, illustrates one specific embodiment of the invention.

On the drawings:

Figure 1 is a schematic view of a dynamoelectric machine embodying this invention, showing the connection of the field and armature windings thereof;

Figure 2 is a graph of the magnetization curve of the converter section of the dynamoelectric machine of Figure 1;

Figure 4:
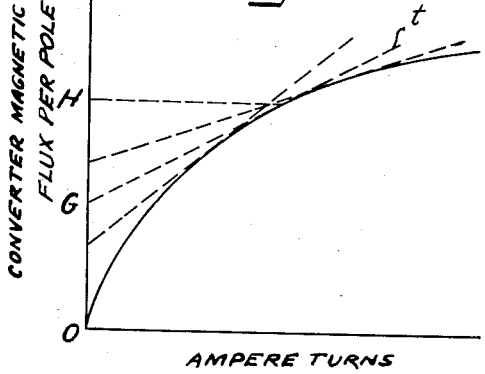
Figure 5:
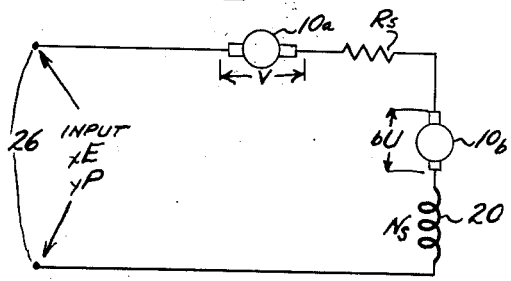

Figure 4 is a magnetization curve of the magnetic circuit elements of the converter section of the dynamoelectric machine of Figure 1, illustrating the manner in which the operating point of the converter section on the magnetization curve may be selected to yield optimum load voltage characteristics; and Figure 5 is an equivalent circuit diagram of the circuit loop including armature winding 10 of Figure 1.

As shown on the drawings:

While not limited thereto, this invention finds particular application to dynamoelectric machines of the so-called two-stack type, wherein a plurality of axially spaced field structures are mounted in a single frame and cooperate with a common armature. The dynamoelectric machine, indicated generally by the numeral 1, is of this type, having a generally cylindrical frame 2 which supports in conventional manner a pair of axially spaced field structures 4 and 6, which hereafter will be referred to, respectively, as the motor field structure and the converter field structure. Suitable means are provided for magnetically insulating the field structures 4 and 6, such as by forming frame 2 from non-magnetic material.

Field structures 4 and 6 are of conventional form, being built up of stacks of individual laminations and may be arranged either to define fixed radial poles or to support a continuous winding. A common armature 8 is provided which is rotatable within the zone of magnetic influence of both the field structures 4 and 6. Armature 8 is provided with two axially spaced sets of magnetic laminations 9 and 11 which respectively cooperate with field structures 4 and 6 and are magnetically insulated by air or a spacer 13. If the shaft 15 of armature 8 is of magnetic material then suitable non-magnetic bushings (not shown) are interposed between laminations 9 and 11 and shaft 15. One armature winding 10 is wound on armature 8 in such manner as to envelop the entire length of armature 8 including both sets of laminations 9 and 11, and thus extends axially into the regions of influence of both the motor field structure 4 and the converter field structure 6. In the equivalent circuit diagram of Figure 5, the portion of winding 10 subject to motor field structure 4 is designated 10a and that subject to converter field structure 6 is designated 10b. In addition, a second armature winding 12 is provided which envelops only the lamination set 11 of the armature 8 which is disposed within the influence of converter field structure 6. A commutator 16 is mounted on one end of armature 8 in conventional fashion and suitable end coil connections of winding 10 are made thereto. On the other end of armature 8, a pair of slip rings 17 are provided and the end coil connections of armature winding 12 are connected thereto. It should be understood that the provision of the slip rings 17 represents only one embodiment of this invention wherein an alternating current output voltage is desired. If a direct current output voltage is desired the slip rings 17 should be replaced by a suitable commutator and brushes arranged in the well known manner.

The brushes 18, which cooperate with slip rings 17, are connected to any desired load circuit $Z_L$ which may comprise a transceiver radio apparatus which requires substantially constant voltage at both a light load condition when operating as a receiver and heavy load when transmitting.

A pair of windings are disposed on the converter field structure 6 comprising, respectively, a series field winding 20 and a shunt field winding 22. A field winding 24 is also provided on the motor field structure 4 and this winding may be connected either as a series or shunt winding. In the specfic example illustrated, winding 24 constitutes a shunt winding. The terminals 26 represent the output terminals of a primary source of power having an undesirably large variation in output voltage. For example, the terminals 26 might represent the output terminals of a D. C. generator which is driven by an internal combustion engine of an aircraft. Suitable conductors are provided to effect the following interconnections of the elements of the dynamoelectric machine with the primary power terminals 26: the series field winding 20 of the converter field structure 6 is connected in series with the main armature winding 10 through suitable brushes 28 and these two series connected elements are then connected directly across the primary power terminals 26; the shunt field winding 22 of the converter field structure 6 is connected directly across primary power terminals 26, although it should be understood that if desired a suitable resistance (not shown) might be provided in series with shunt field winding 22 for adjustment purposes.

The motor field winding 24 is connected in series with a variable resistance 30 and this series connection is then connected across the primary power terminals 26. Variable resistance 30 preferably comprises a speed responsive resistance, i. e., the effective value of resistance 30 is varied by a speed governor 32, which may comprise any one of several well known forms, to control the current supplied to the motor field winding in accordance with the speed of the armature 8. Accordingly, the speed of armature 8 can be controlled by speed regulating resistance 30, to be held at a substantially constant value independent of variations of the voltage across the primary power terminals 26.

From the construction thus far described it will be apparent to those skilled in the art that the output voltage generated across the load impedance $Z_L$ can be made to be substantially constant for any given power input to the load $Z_L$ independent of the variations of the voltage existing across primary power terminals 26, by proper proportioning of the effect of the converter shunt field 22 relative to the converter series field 20. This desirable characteristic of the dynamoelectric machine may be readily demonstrated.

Assuming a constant power input to the load $Z_L$, hence a common power output of the converter winding 12, and neglecting the effect of losses in the dynamoelectric machine, it follows that the power input to the dynamoelectric machine supplied from primary power terminals 26 will also be constant. Therefore, when the voltage across primary power input terminals 26 increases, the current supplied to the dynamoelectric machine 1 must decrease in order to maintain a constant power input. The increase in voltage across the terminals 26 produces a corresponding increase in the flux developed by converter shunt field winding 22. However, the resulting decrease in current supplied to the main armature winding 10 of the dynamoelectric machine 1 reduces the flux developed by the converter series field winding 20. Therefore, by proper proportioning of the ampere turns of the converter shunt field 22 with respect to the ampere turns of the converter series field 20, these opposite variations in the excitation of the converter field structure may be made to exactly cancel. It follows that the effective flux acting upon the generator winding 12 will remain constant and independent of variations in voltage of the primary power terminals 26.

The speed of the armature 8 is maintained substantially constant by the operation of the centrifugally controlled variable resistor 30. Thus, since the total flux in the generator field structure 6 is constant, and the speed of the armature 8 is constant, it follows that the voltage output of generator winding 12 will be constant for any constant load drawn by load impedance $Z_L$.

Figure 3:
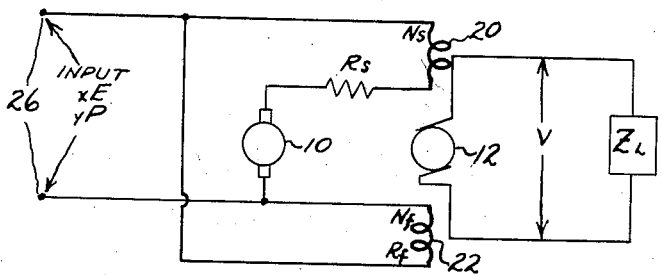
Figure 3 is an equivalent circuit diagram of the converter section of the dynamoelectric machine of Figure 1.

A dynamoelectric machine embodying this invention may also be utilized to produce an output voltage which will remain within narrow prescribed limits for a wide variation of power supplied to the load, as well as for wide variations in the voltage of the primary power source. To accomplish such novel and improved results, the design of a machine similar to that shown in Figure 1 must be accomplished to produce an operation of the machine over a predetermined, selected region of the magnetic saturation curve of the machine, over the range of variations in primary power voltage and output load to which the machine will be subject in service. Furthermore, the ratio of series ampere turns of converter winding 20 to the shunt ampere turns of converter winding 22 must be proportioned as a function of the extent of variation of the primary power voltage. That such unusual operating characteristics of a dynamoelectric machine similar to the type shown in Figure 1 may be obtained by selection of a particular portion of the saturation curve of the machine for its operation has been thoroughly demonstrated by experiment and may be confirmed by mathematical analysis, such as follows:

Considering first the design of the converter section, the equivalent circuit diagram is as shown in Figure 3. The magnetization curve of the converter section of the machine is shown in Figure 2 as a plot of generated voltage U as a function of total field ampere turns (including both series field ampere turns and shunt field ampere turns).

Assuming that the magnetization curve is a straight line over the region of operation of the converter, as between the points $a$ and $b$, such straight line may be extended to the ordinate axis where it intersects at a value A and has a slope $s$ relative to the abscissa axis ($s=\tan\theta$). The equation for the generated voltage in the converter section can then be written as (1)
$$U = A + s \text{ (series amp. turns + shunt amp. turns)}$$

Now let (2) E=minimum value of input voltage
P=minimum value of input power, exclusive of excitation
$N_f$=shunt turns per pole
$N_s$=series turns per pole
$R_f$=resistance of shunt field circuit
$xE$=input voltage at any time
$yP$=input power at any time exclusive of excitation Then Equation 1 can be written (3) $$U = A + s\left(\frac{N_f E}{R_f}x + \frac{N_s P}{E}\frac{y}{x}\right)$$

Now let (4) $$B = \frac{sN_f E}{R_f}$$

$$C = \frac{sN_s P}{E}$$

Then Equation 3 becomes (5) $$U = A + Bx + C\frac{y}{x}$$

Now let
V=load voltage at any time
D=minimum voltage drop in armature circuit of converter section, and
$zD$=voltage drop in armature circuit of converter section at any time
Now (7) $$V = U - Dz$$

Substituting from (5)

(8) $$V = A + Bx + C\frac{y}{x} - Dz$$

It will be shown that the regulation of load voltage V is so small that the load current and the input power $yP$ are substantially proportional.

Now consider the four extremes of operation to which the machine will be subjected and let $\bar{x}, \bar{y}$ and $\bar{z}$ equal respectively the maximum values of $x, y$ and $z$:

Case 1.—Minimum input voltage; minimum load current and minimum power input. For this condition, $x=y=z=1$.

Hence (9) $$V_1 = A + B + C - D$$

Case 2.—Maximum input voltage; minimum load current and minimum power input. For this condition $x=\bar{x}, y=z=1$.

Hence

(10) $$V_2 = A + B\bar{x} + \frac{C}{\bar{x}} - D$$

Case 3.—Minimum input voltage; maximum current output and maximum power input. For this condition $x=1, y=\bar{y}, z=\bar{z}$.

Hence

(11) $$V_3 = A + B + C\bar{y} - D\bar{z}$$

Case 4.—Maximum input voltage; maximum current output and maximum power input. For this condition $x=\bar{x}, y=\bar{y}, z=\bar{z}$.

Hence

(12) $$V_4 = A + B\bar{x} + C\frac{\bar{y}}{\bar{x}} - D\bar{z}$$

The changes in output voltage due to input voltage change from maximum to minimum at the two extremes of load is given by

(13) $$V_2 - V_1 = (\bar{x}-1)\left(B - \frac{C}{\bar{x}}\right)$$

and

(14) $$V_4 - V_3 = (\bar{x}-1)\left(B - C\frac{\bar{y}}{\bar{x}}\right)$$

Let the average output voltage change be zero for best regulation, or

(15) $$\frac{(V_2-V_1)+(V_4-V_3)}{2} = 0$$

Substituting from (13) and (14),

(16) $$(\bar{x}-1)\left(B - C\frac{1+\bar{y}}{2\bar{x}}\right) = 0$$

Solving for B,

(17) $$B = \frac{1+\bar{y}}{2\bar{x}}C$$

Similarly, the changes in output voltage due to load change from maximum to minimum at the two extremes of input voltage are

(18) $$V_3 - V_1 = (\bar{y}-1)C - (\bar{z}-1)D$$

and

(19) $$V_4 - V_2 = \frac{\bar{y}-1}{\bar{x}}C - D(\bar{z}-1)$$

Setting the average of the changes to zero and solving for C in terms of D,

(20) $$C = \frac{2\bar{x}(\bar{z}-1)}{(\bar{x}+1)(\bar{y}-1)}D$$

Substituting in (17)

(21) $$B = \frac{(1+\bar{y})(\bar{z}-1)}{(\bar{x}+1)(\bar{y}-1)}D$$

Now let $V_0$ = average output voltage

Hence

(22) $$V_0 = \frac{V_1 + V_2 + V_3 + V_4}{4}$$

Substituting from (9) through (12)

(23) $$V_0 = A + \left(\frac{\bar{y}+1}{\bar{y}-1}(\bar{z}-1) - \left(\frac{1+\bar{z}}{2}\right)\right)D$$

Similarly, let $U_0$ = average generated voltage. By the same process as followed for $V_0$, $U_0$ can be determined as

(24) $$U_0 = A + \frac{\bar{y}+1}{\bar{y}-1}(\bar{z}-1)D$$

In order to determine under what conditions $U_0$ (and $V_0$) occur, substitute (20) and (21) back into (5),

(25) $$U = A + \left((1+\bar{y})x + \frac{2\bar{x}y}{x}\right)\frac{(z-1)D}{(1+\bar{x})(\bar{y}-1)}$$

Equating $U$ and $U_0$ for optimum regulation gives

(26) $$x^2 + \frac{2\bar{x}}{1+\bar{y}}y - (1+\bar{x})x = 0$$

Since (26) does not possess a unique solution, selected solutions will be assumed.

At average load,

(27) $$y = \frac{1+\bar{y}}{2}$$

Substituting (27) in (26) gives as solutions

(28) $$x = 1, \; x = \bar{x}$$

Hence, the average voltage will occur at average load and at both minimum and maximum input voltage. Since the average change in output voltage was taken as equal to zero, $V_0$ would ordinarily be taken as rated in designing this machine.

Solving for the changes in output voltage now gives,

(29)
$$-(V_1 - V_0) = (V_2 - V_0) =$$
$$(V_3 - V_0) = -(V_4 - V_0) = \frac{\bar{x}-1}{2(\bar{x}+1)}(\bar{z}-1)D$$

(Algebra not shown since it is rather lengthy)

That is, the output voltage always lies between

(30) $$V_0 \pm \frac{\bar{x}-1}{2(\bar{x}+1)}(\bar{z}-1)D$$

as long as the input voltage and the load lie between the prescribed limits.

It should be noticed that if the load is constant that is, $\bar{z}=1$, the output voltage is constant, which verifies the assertions made prior to the analysis.

It should be further noticed that in terms of usual values of $\bar{x}$, $\bar{z}$ and $D$ which will be encountered in normal designing practice, the variation in output voltage is over a very narrow range, the regulation not exceeding 2% for wide variations in input voltage and load supplied.

The foregoing analysis has established the relationship by which the operating region of the magnetic saturation curve may be selected by the designer to accomplish the novel results of this invention.

The procedure followed is quite simple. A magnetization curve is computed or measured for the magnetic circuit to be used, which of course would consist of the converter field structure 6 and armature lamination set 11. Such curve may be plotted in terms of flux per pole vs. total ampere turns. The designer of course knows the range of variation of input voltage and load under which the machine must operate and also the desired average load voltage which the machine is to produce. Hence $\bar{x}$, $\bar{y}$ and $V_0$ are known. Ordinary design experience will furnish a value for $\bar{z}$ and $D$ which will be substantially correct. Hence $V_0$ may be calculated from (7). Now from (24) the ratio $A/U_0$ is determined as

(31) $$A/U_0 = 1 - \frac{\bar{y}+1}{\bar{y}-1}(\bar{z}-1)\frac{D}{U_0}$$

and hence $A/U_0$ may be calculated. Then as shown in Figure 4 tangents are drawn to the magnetization curve until one, such as at $t$ on Figure 4, is located whose intersection with the ordinate axis fulfills the relationship $$\frac{OG}{OH} = \frac{A}{U_0}$$

where $OG$ is ordinate from origin to the intersection and $OH$ is ordinate of point of tangency with magnetization curve. Such point on the magnetization curve determines the value of total field ampere turns at average generated voltage $U_0$ and the armature winding 12 is designed to yield $U_0$ at such value of excitation.

The remaining step is the determination of the relative proportions of the series and shunt ampere turns. From (4)

(32) $$\frac{\text{series amp. turns}}{\text{shunt amp. turns}} = \frac{C}{B}y$$

and from (17)

(33) $$\frac{\text{series amp. turns}}{\text{shunt amp. turns}} = \frac{2\bar{x}y}{1+y}$$

When machine is generating $U_0$, the value of $y$ is the average value, or $$y = \frac{1+\bar{y}}{2}$$

Hence (33) becomes

(34) $$\frac{\text{series amp. turns}}{\text{shunt amp. turns}} = \bar{x} = \frac{\bar{x}E}{E}$$

To paraphrase Equation 34, the series and shunt ampere turns of the converter field structure 6 should be proportioned so that the ratio of series ampere turns to shunt ampere turns will equal the ratio of maximum input voltage to minimum input voltage.

In accordance with this invention therefore, the machine shown in Figure 1 is so designed as to operate about a preselected point on the magnetization curve of the converter section and the ratio of the series ampere turns of the converter section to the shunt ampere turns is equal to the ratio of the maximum input voltage to the minimum input voltage. Such machine will then yield a load voltage which varies only between narrow predetermined limits for wide variations of input voltage and output load.

The motor section of the dynamoelectric machine of Figure 1 should also be designed to satisfy certain conditions. Referring to the equivalent circuit diagram of Figure 5 which illustrates the circuit of the armature winding 10

Let $R_s$ = resistance of armature winding 10 and series field 20

$v$ = generated voltage in portion 10a of armature winding 10 produced by motor field 24

$bU$ = D. C. generated voltage in portion 10b of armature winding 10 produced by shunt field 22 and series field 20.

Then the voltage equation for the circuit of armature winding 10 is

(35)
$$v + bU + \frac{Py}{Ex}R = xE$$

or $$v = xE - \frac{y}{x}\frac{PR}{E} - bU$$

Now $v$ will be a maximum when input voltage is a maximum and power input is a minimum, or where $$x = \bar{x},\ y = 1 + U = U_1$$

Hence

(36)
$$v_{max} = \bar{x}E - \frac{PR}{\bar{x}E} - bU_1$$

Similarly, $v$ will be a minimum when input voltage is a minimum and power input is a maximum, or where $$x = 1,\ \bar{y} = y,\text{ and } U = U_3$$

Hence

(37)
$$v_{min} = E - \frac{PR\bar{y}}{E} - bU_3$$

Now let $$r = \frac{v_{min}}{v_{max}}$$

Hence

(38)
$$v_{min} = r v_{max}$$

Substituting (38) in (36) and solving (36) and (37) by determinants for $v_{max}$ and $b$.

(39)
$$v_{max} = \frac{(\bar{x}U_3 - U_1)E + \left(U_1\bar{y} - \frac{U_3}{\bar{x}}\right)\frac{PR}{E}}{rU_3 - U_1}$$

(40)
$$b = \frac{(r - \bar{x})E + \left(\frac{1}{\bar{x}} - r\bar{y}\right)\frac{PR}{E}}{rU_3 - U_1}$$

Now $r$ can be selected by any person skilled in the art on the basis of experience and conditions for satisfactory commutation. Hence Equations 39 and 40 permit $v_{max}$ and $b$ to be computed, from which the design of the motor section field 24 and the armature winding 10 may be completed.

Accordingly, the invention provides the relationships between the field and armature elements of the dynamoelectric machine of Figure 1 by which novel and improved output voltage characteristics are obtainable.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A dynamoelectric machine including a stationary field member and a rotatable armature member, means for dividing said stationary field member into two axially spaced field structures, a first winding on said armature member extending axially adjacent both said axially spaced field structures, a second winding on said armature member disposed adjacent only the first of said axially spaced field structures, first and second field windings on said first field structure, circuit means for supplying current to said first armature winding from a power source through said first field winding, means for connecting said second field winding to be energized directly by the power source, and means for connecting said second armature winding to a load, whereby the voltage applied to the load is substantially constant and independent of the voltage of the power source.

2. A dynamoelectric machine including a stationary field member and a rotatable armature member, means for dividing said stationary field member into two axially spaced field structures, a first winding on said armature member extending axially adjacent both said axially spaced field structures, first and second field windings disposed on said first field structure, circuit means for supplying current to said first armature winding from a power source through said first field winding, means for connecting said second field winding to be energized directly by the power source, a third field winding disposed on said second field structure, regulating means for energizing said third field winding to maintain the speed of said armature member substantially constant, a second winding on said armature member disposed adjacent only the first of said axially spaced field structures, and means for connecting said second armature winding to a load, whereby the voltage supplied to the load is substantially constant and independent of the voltage of the power source.

3. A dynamoelectric machine including a stationary field member and a rotatable armature member, means for dividing said stationary field member into two axially spaced field structures, respectively a motor field structure and converter field structure, an input winding on said armature member extending axially adjacent both said motor and converter field structures, a series field winding and a shunt field winding disposed on said converter field structure, circuit means for supplying current to said input winding from a power source through said series field winding, means for connecting said shunt field winding to be energized directly by the power source, an output winding on said armature member disposed adjacent only said converter field structure, and means connecting said output winding to a load, whereby the load voltage supplied by said output winding is substantially constant and independent of the voltage of the power source.

4. A dynamoelectric machine including a stationary field member and a rotatable armature member, means for dividing said stationary field member into two axially spaced field structures, respectively a motor field structure and a converter field structure, an input winding on said armature member extending axially adjacent both said motor and said converter field structures, a series field winding and a shunt field winding disposed on said converter field structure, circuit means for supplying current to said input winding from a power source through said series field winding, means for connecting said shunt field winding to be energized directly by the power source, a speed controlling shunt winding disposed on said motor field structure, regulating means for supplying current to said speed controlling shunt field winding to maintain the speed of said armature member substantially constant, an output winding on said armature member disposed adjacent only said converter field structure, and means connecting said output winding to a load, whereby the load voltage supplied by said output winding is substantially constant and independent of the voltage of the power source.

5. A dynamoelectric machine including a stationary field member and a rotatable armature member, means for dividing said stationary field member into two axially spaced field structures, respectively a motor field structure and a converter field structure, an input winding on said armature member extending axially adjacent both said motor and converter field structures, a series field winding and a shunt field winding disposed on said converter field structure, a power source having a varying voltage output, circuit means for supplying current to said input winding from said power source through said series field winding, means for connecting said shunt field winding to be energized directly by the power source, an output winding on said armature member disposed adjacent only said converter field structure, and means connecting said output winding to a variable impedance load, the ampere turns of said shunt and series field windings being proportioned in accordance with the regulation of the power source voltage and to produce operation of said converter structure in a predetermined region of the saturation curve thereof, whereby the load voltage supplied by said output winding varies only over a predetermined limited range irrespective of the variations of the voltage of the power source and the load current.

6. A dynamoelectric machine including a stationary field member and a rotatable armature member, means for dividing said stationary field member into two axially spaced field structures, respectively a motor field structure and a converter field structure, an input winding on said armature member extending axially adjacent both said motor and converter field structures, a series field winding and a shunt field winding disposed on said converter field structure, circuit means for supplying current to said input winding from a D. C. power source through said series field winding, means for connecting said shunt field winding to be energized directly by the D. C. power source, a speed controlling shunt field winding disposed on said motor field structure, regulating means for supplying current to said speed controlling shunt field winding from the D. C. power source to maintain the speed of the said armature member substantially constant, an output winding on said armature member disposed adjacent only said converter field structure, and means connecting said output winding to a variable impedance load, the ampere turns of said shunt and series field windings being proportioned in accordance with the regulation of the power source voltage and to produce operation of said converter structure in a predetermined region of the saturation curve thereof, whereby the load voltage supplied by said output winding varies only over a predetermined limited range irrespective of wide variations of the voltage of the power source and the load current.

7. The combination defined in claim 5 wherein the ratio of ampere turns of said series field to ampere turns of said shunt field is substantially equal to the ratio of the maximum voltage of the power source to the minimum voltage of the power source.

8. The combination defined in claim 6 wherein the ratio of ampere turns of said series field to ampere turns of said shunt field is substantially equal to the ratio of the maximum voltage of the power source to the minimum voltage of the power source.

9. A dynamoelectric machine comprising a pair of stationary field structures, a pair of co-rotatable armature sections respectively cooperating with said field members, a first winding enveloping both of said armature sections, a second winding enveloping only the first of said armature sections and disposed in the magnetic circuit of the first field member, first and second field windings on said first field structure, circuit means for supplying current to said first armature winding from a power source through said first field winding, means for connecting said second field winding to be energized directly by the power source, and means for connecting said second armature winding to a load, whereby the voltage applied to the load is substantially constant and independent of the voltage of the power source.

10. A dynamoelectric machine comprising a pair of stationary field structures, a pair of co-rotatable armature sections respectively cooperating with said field members, a first winding enveloping both of said armature sections, a second winding enveloping only the first of said armature sections and disposed in the magnetic circuit of the first field member, first and second field windings on said first field structure, circuit means for supplying current to said first armature winding from a power source through said first field winding, means for connecting said second field winding to be energized directly by the power source, means for connecting said second armature winding to a load, a third field winding disposed on said second field structure, and regulating means for energizing said third field winding to maintain the speed of said armature sections substantially constant, whereby the voltage supplied to the load is substantially constant and independent of the voltage of the power source.

JOSEPH NADER.

REFERENCES CITED

The following references are of record in the file of this patent:

UNITED STATES PATENTS

| Number | Name | Date |
|---|---|---|
| 563,895 | Thomson | July 14, 1896 |
| 1,970,498 | Malaussene | Aug. 14, 1934 |
| 2,018,108 | Allen | Oct. 22, 1935 |

FOREIGN PATENTS

| Number | Country | Date |
|---|---|---|
| 11,153 | Great Britain | 1895 |